US007356262B2

(12) United States Patent
Giaretta et al.

(10) Patent No.: US 7,356,262 B2
(45) Date of Patent: Apr. 8, 2008

(54) TIME DIVISION MULTIPLEXING OF ANALOG SIGNALS IN AN OPTICAL TRANSCEIVER

(75) Inventors: Giorgio Giaretta, Mountain View, CA (US); Andreas Weber, Los Altos, CA (US); Dan Case, Gilroy, CA (US)

(73) Assignee: Finisar Corporation, Sunnyvale, CA (US)

( * ) Notice: Subject to any disclaimer, the term of this patent is extended or adjusted under 35 U.S.C. 154(b) by 671 days.

(21) Appl. No.: 10/703,699

(22) Filed: Nov. 6, 2003

(65) Prior Publication Data

US 2004/0136721 A1    Jul. 15, 2004

Related U.S. Application Data

(60) Provisional application No. 60/424,209, filed on Nov. 6, 2002.

(51) Int. Cl.
*H04B 10/00* (2006.01)
(52) U.S. Cl. .................. 398/135; 398/138; 398/130; 398/128
(58) Field of Classification Search ............... 398/135, 398/138, 128, 130; 455/73, 81, 88, 553.1
See application file for complete search history.

(56) References Cited

U.S. PATENT DOCUMENTS

| 4,916,705 | A |   | 4/1990  | Glance           |         |
|-----------|---|---|---------|------------------|---------|
| 5,019,769 | A |   | 5/1991  | Levinson         |         |
| 5,383,208 | A |   | 1/1995  | Queniat et al.   |         |
| 5,442,321 | A |   | 8/1995  | Bayruns et al.   |         |
| 5,479,288 | A |   | 12/1995 | Ishizuka et al.  |         |
| 5,502,785 | A |   | 3/1996  | Wang et al.      |         |
| 5,537,093 | A |   | 7/1996  | Aunon et al.     |         |
| 5,734,300 | A |   | 3/1998  | Yoder            |         |
| 5,861,908 | A |   | 1/1999  | Tonosaki et al.  |         |
| 5,878,015 | A |   | 3/1999  | Schell et al.    |         |
| 5,933,264 | A |   | 8/1999  | Van Der Heijden  |         |
| 5,956,168 | A |   | 9/1999  | Levinson et al.  |         |
| 5,995,033 | A | * | 11/1999 | Roeckner et al.  | 341/155 |
| 6,130,562 | A |   | 10/2000 | Bosch et al.     |         |
| 6,333,804 | B1|   | 12/2001 | Nishiyama et al. |         |
| 6,400,857 | B1|   | 6/2002  | Hatami-Hanza et al. |      |
| 6,414,974 | B1|   | 7/2002  | Russell et al.   |         |
| 6,912,361 | B2| * | 6/2005  | Aronson et al.   | 398/135 |
| 6,975,642 | B2| * | 12/2005 | Levinson et al.  | 370/445 |
| 7,079,775 | B2| * | 7/2006  | Aronson et al.   | 398/137 |

(Continued)

*Primary Examiner*—M. R. Sedighian
(74) *Attorney, Agent, or Firm*—Workman Nydegger

(57) ABSTRACT

An optical transceiver module having a multiplexing analog control interface. The optical transceiver module comprises a controller and integrated post-amplifier/laser driver, which are included on a printed circuit board associated with the module. Transmitting and receiving optical sub-assemblies are also included in the module. A time division multiplexing analog control signal interface interconnects the controller with the integrated post-amplifier/laser driver. Digital control signals produced by the controller are converted and combined into a multiplexed analog control signal and transmitted via the interface to the integrated post-amplifier/laser driver. After receipt by the integrated post-amplifier/laser driver, the multiplexed analog control signal is divided into discrete analog control signals and forwarded to a plurality of control devices that use the control signals to modify a plurality of operating parameters of the transceiver module. The time division multiplexing analog control signal interface can also be employed to provide feedback to the controller relating to the operation of the control devices.

39 Claims, 3 Drawing Sheets

U.S. PATENT DOCUMENTS

| | | | |
|---|---|---|---|
| 7,155,134 B2 * | 12/2006 | Azadet | 398/202 |
| 2002/0003645 A1 * | 1/2002 | Kim et al. | 359/145 |
| 2002/0021468 A1 * | 2/2002 | Kato et al. | 359/152 |
| 2002/0071164 A1 | 6/2002 | Lauge et al. | |
| 2003/0152390 A1 * | 8/2003 | Stewart et al. | 398/135 |

* cited by examiner

TIME DIVISION MULTIPLEXING OF ANALOG SIGNALS IN AN OPTICAL TRANSCEIVER

CROSS-REFERENCE TO RELATED APPLICATIONS

This applications claims the benefit of U.S. Provisional Patent Application Ser. No. 60/424,209, filed Nov. 6, 2002, which is incorporated herein by reference.

BACKGROUND OF THE INVENTION

1. The Field of the Invention

The present invention generally relates to optical transceiver devices. More particularly, the present invention relates to structures and methods for transmitting analog control signals between transceiver components while reducing the number of connections required to do so.

2. The Related Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmission node to a reception node. An optical transceiver at the transmission node receives an electrical signal from a host device, such as a computer, and converts the electrical signal via a laser to an optical signal. The optical signal can then be transmitted in a fiber optic cable via the optical network, such as a LAN backbone, for instance. The optical signal is then received by a remote reception node of the network. Once received by the reception node, the optical signal is fed to another optical transceiver for conversion into electrical signals. The electrical signals are then forwarded to a host device, such as a computer, for processing. The optical transceivers described above have both signal transmission and reception capabilities; thus, the transmitter portion of the transceiver converts an incoming electrical signal into an optical signal, whereas the receiver portion of the transceiver converts an incoming optical signal into an electrical signal.

The majority of components included in the optical transceiver are positioned on a printed circuit board ("PCB"). These components include a controller, which governs general operation of the transceiver, a laser driver for controlling operation of the laser in the transmitter portion, and a post-amplifier for controlling the conversion of incoming optical signals into electrical signals in the receiver portion. These components are typically incorporated into integrated circuits on the PCB.

The controller is operably connected to both the laser driver and the post-amplifier in order to govern their operation and to ensure proper transceiver function. In particular, the controller is responsible for controlling one or more parameters associated with these components during operation of the transceiver. Examples of these operational parameters include the rise time and amplitude of the electrical data signal that is conditioned by the laser driver, the rise time and amplitude of the data signal conditioned by the post-amplifier, and hysteresis and threshold set points for loss of signal detection circuitry in the post-amplifier. Each of these operational parameters is adjusted by a control device, such as a control amplifier, that is included in either the post-amplifier or the laser driver. In known systems, the controller controls the operational parameters via a plurality of analog signal lines that interconnect the controller with the respective control amplifier on the laser driver or the post-amplifier. Because of their analog nature, one analog control line extending between the controller and the respective control amplifier is typically required for each parameter over which control is desired. This creates added complexity and expense to the design and manufacture of the transceiver PCB. Additionally, this requires each IC to be larger in size.

There is therefore a need for an optical transceiver that enables control over the various operational parameters of the transceiver components while minimizing the complexity and cost of the transceiver. Moreover, it would be particularly useful to design the optical transceiver such that the integrated circuits that implement transceiver functionality are configured with a minimum of interconnects and pins, thereby reducing overall chip sizes within the transceiver.

BRIEF SUMMARY OF THE INVENTION

Briefly summarized, embodiments of the present invention are directed to an optical transceiver device utilizing time division multiplexing techniques and associated structure to control operational aspects of the transceiver. This in turn enables the transceiver to be controlled while minimizing the number of pins and connections located within the transceiver.

In one embodiment, the present optical transceiver comprises a controller chip coupled to a laser driver and post-amplifier. Each of these components is located on a printed circuit board, which is at least partially contained within a transceiver module housing. The laser driver and post-amplifier are preferably integrated as a single component on the printed circuit board, providing certain operational advantages and economy. The integrated laser driver/post-amplifier governs the operation of both a transmitter optical sub-assembly, which is used to convert an electrical data signal into a modulated optical signal and transmit it to an optical communications network, and a receiver optical sub-assembly, which receives modulated optical signals from the network and converts them back to electrical data signals for use by one or more connected components. The transmitter and receiver optical sub-assemblies, the integrated laser driver/post-amplifier, and the controller are interconnected within the transceiver so as to function together in transmitting and receiving optical signals as part of an optical communications network, for example.

In accordance with embodiments of the present invention, a multiplexing analog control interface is established between the controller and the integrated post-amplifier/laser driver to enable analog control of transceiver elements. The multiplexing interface comprises multiplexing and demultiplexing interface nodes located on the controller and the post-amplifier/laser driver, respectively, with an analog signal line interconnecting the two nodes. A clock signal line also extends between the two nodes to coordinate the transfer of the control signals.

During operation of the optical transceiver, the controller issues digital control signals intended for use by several of a plurality of control devices in the laser driver/post-amplifier. The multiplexing interface node of the controller combines these digital signals into a time division multiplexed signal, which is then converted into an analog time division multiplexed signal. This multiplexed analog control signal is relayed via the analog signal line to the demultiplexing interface node located on the post-amplifier/laser driver, where the control signal is divided back into its discrete analog control signals. Each of these control signals is directed by a glue logic device to the appropriate control device on the post-amplifier/laser driver, which uses the control signal to modify a specified operating parameter relating to the optical transceiver. Examples of such operational parameters include the amplitude or rise time of the data signal transmitted or received by the transceiver, and loss of signal threshold settings for received data signals, among others.

In one embodiment, digital control signals are transmitted from controller to post-amplifier/laser driver via the multiplexing analog control interface in a one-way configuration. In another embodiment, data can be sent in both directions between these two components, enabling not only control signals to be transmitted to the post-amplifier/laser driver, but also for feedback signals to be conveyed from the post-amplifier/laser driver back to the controller. This enables the controller to govern transceiver operation based upon real time data provided by the post-amplifier/laser driver.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
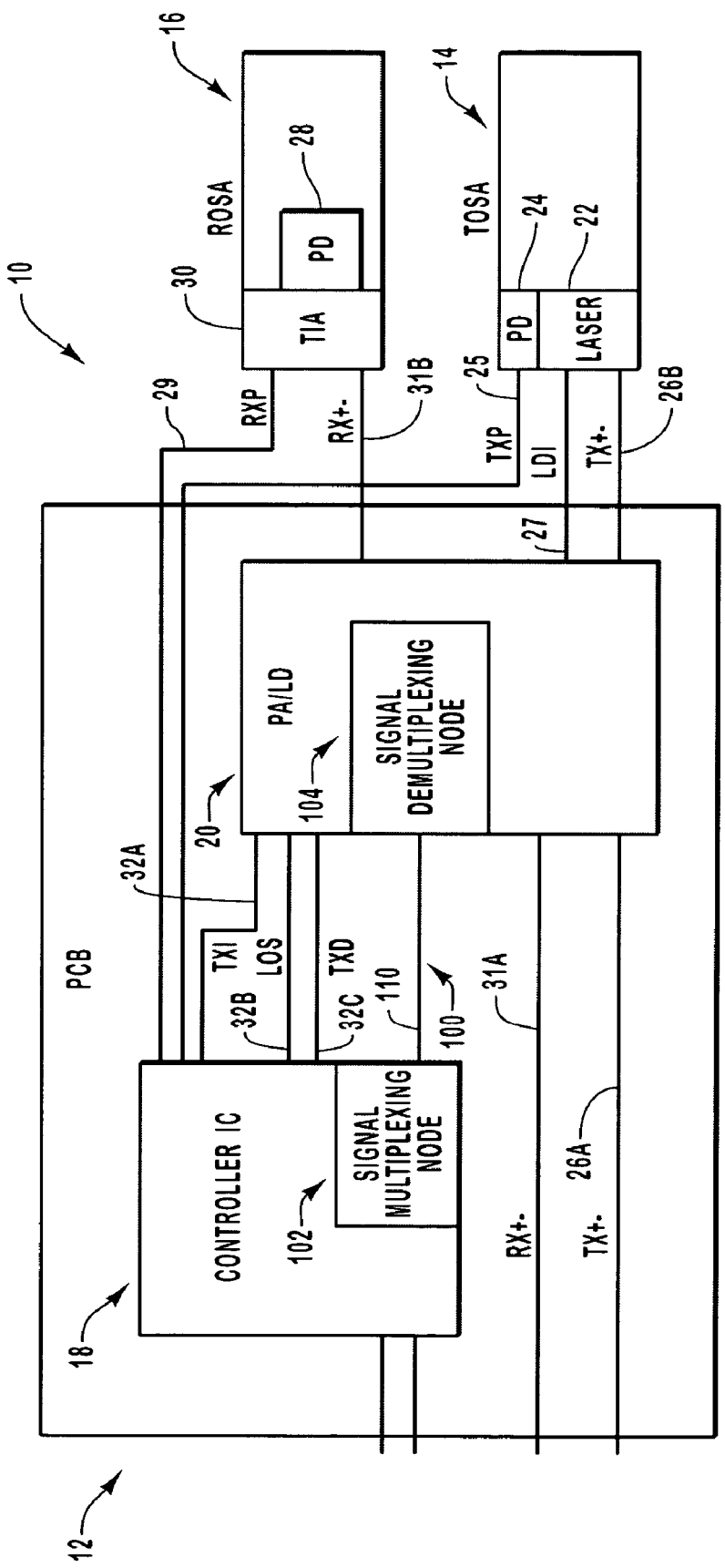
FIG. 1 is a schematic view of various components comprising an optical transceiver manufactured in accordance with one embodiment of the present invention.
Figure 2:
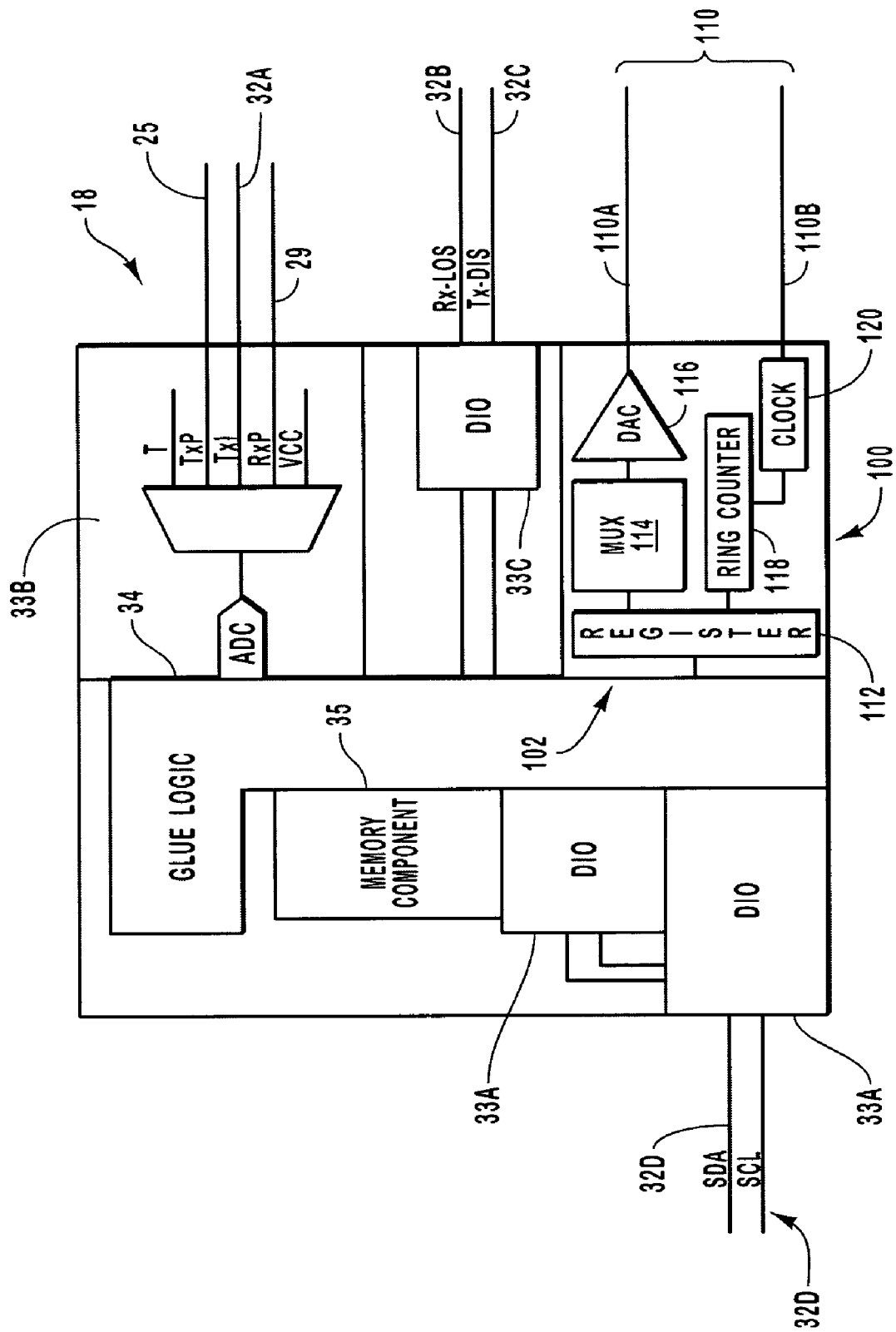
FIG. 2 is a schematic view of the controller of FIG. 1 configured in accordance with one embodiment of the present invention.
Figure 3:
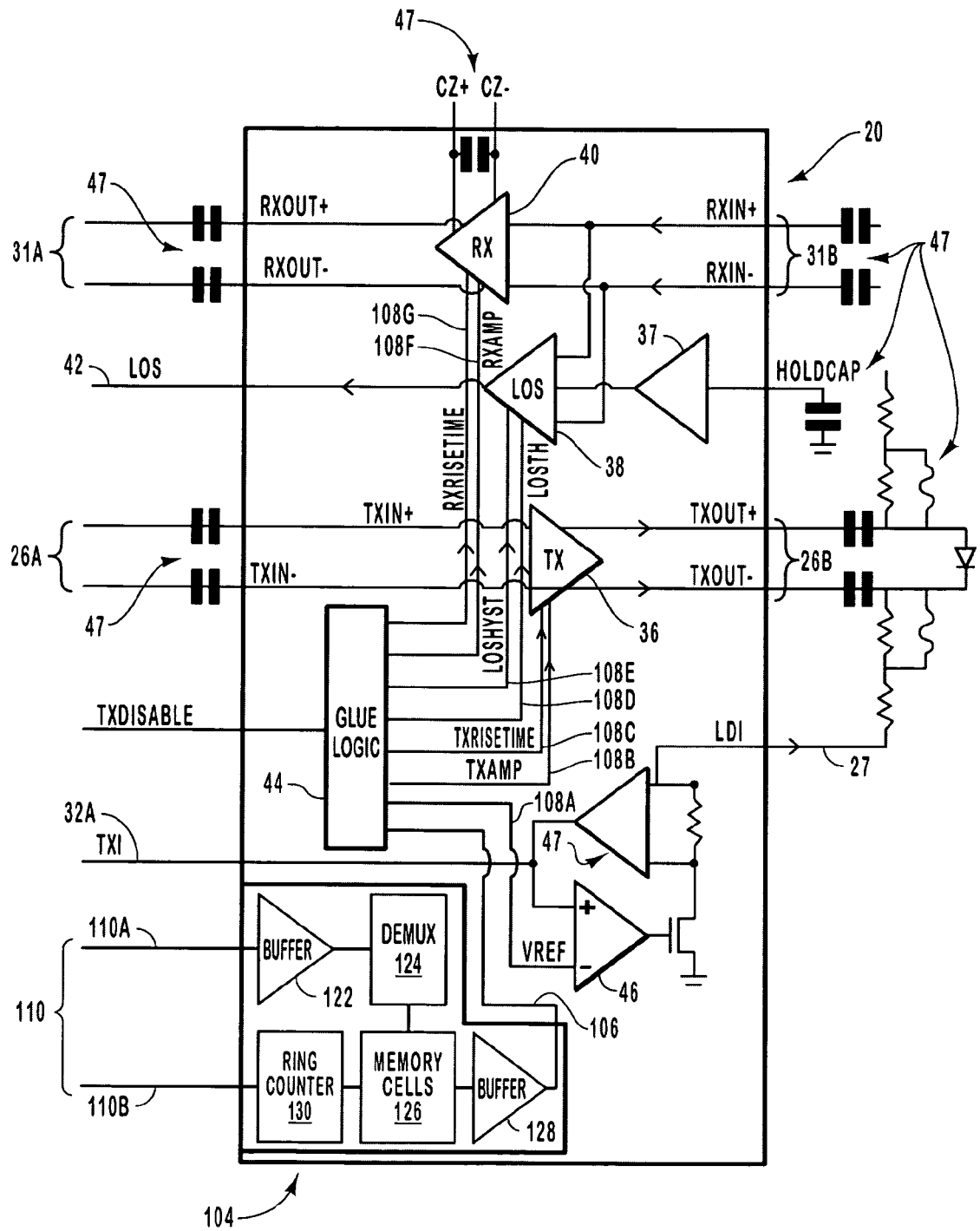
FIG. 3 is a schematic view of the post amplifier and laser driver of FIG. 1, configured in accordance with one embodiment of the present invention.

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale. FIGS. 1-3 depict various features of embodiments of the present invention, which is generally directed to an optical transceiver having time division multiplexed analog parameter control. Optical transceivers made in accordance with embodiments of the present invention facilitate simplified analog control and monitoring of one or more operational parameters associated with transceiver operation, including transmitter and receiver data signal risetime and amplitude, receiver loss of signal functions, and reference voltage settings.

Reference is first made to FIG. 1, which depicts various components comprising an optical transceiver, generally designated at 10. The transceiver 10 generally includes a printed circuit board ("PCB") 12, a transmitter optical subassembly ("TOSA") 14, and a receiver optical subassembly ("ROSA") 16.

Both the TOSA 14 and the ROSA 16 are electrically connected to a controller 18 and an integrated post-amplifier/laser driver ("PA/LD") 20, which are in turn positioned on the PCB 12. Generally, these components cooperate to enable the transceiver 10 both to transmit and to receive optical signals that travel via an optical communications network (not shown) For instance, the PA/LD 20 is responsible for conditioning data signals that are to be transmitted by the TOSA 14, as well as conditioning data signals received by the ROSA 16. As will be explained, the controller 18 is responsible for governing the operation of the TOSA 14, ROSA 16, and other components that comprise the optical transceiver 10.

In greater detail, the PA/LD 20 can receive an electrical data signal to be transmitted from a connected device, such as a computer (not shown), via line 26A. The PA/LD 20 conditions that signal for receipt by the TOSA 14 via line 26B. A laser 22, included in the TOSA 14 and powered by a DC current that is conducted via current line 27 (indicated by "LDI" for "laser driver current"), receives the conditioned electrical data signal and converts it into an optical data signal for transmission to the optical communications network. A photodiode 24 is also located in the TOSA 14 to monitor the operation of the laser 22. Specifically, the photodiode 24 can communicate data relating to the light power with which the laser 22 is transmitting to the PA/LD 20 or controller 18 via a communication line 25, indicated by "TXP" for "transmitter power."

Analogous to the above discussion, an incoming optical data signal from the optical communications network can be received by the optical transceiver 10 into the ROSA 16. A photodiode 28 and amplifier 30 in the ROSA 16 cooperate to convert and initially amplify the optical data signal into an electrical data signal, which is then forwarded to the PA/LD 20 via line 31B for conditioning before being forwarded to a connected device, such as a computer (not shown) via line 31A. Information regarding the power at which the ROSA 16 is receiving the optical data signal from the communications network can be relayed to the controller 18 via a communication line 29, indicated by "RXP" for "receiver power."

As shown in FIG. 1, The PA/LD 20 and the controller 18 are interconnected via various communication/control lines. A line 32A extends between the controller 18 and the PA/LD 20 (indicated by "TXI" for "transmitter current") to provide information to the controller 18 concerning the current level supplied to the laser 22 by the LDI line 27. A line 32B extends between the PA/LD 20 and the controller 18 (indicated by "LOS" for "loss of signal") to indicate when the signal received by the ROSA 16 is below detectable levels. A line 32C extends between the PA/LD 20 and the controller 18 (indicated by "TXD" for "transmitter disable") to allow the controller to disable operation of the TOSA 14 when transmission of an optical signal is not desired. Communication lines 32D extending from the controller 18 can be connected with a host device (not shown) to provide identification information and other data relating to transceiver operation to the host device.

Note that the presence of the lines described above are exemplary in accordance with one embodiment of the present invention; thus, the particular implementation of control and communication lines as illustrated in FIGS. 1-3 are not meant to limit the present invention in any way. Thus, alternative or additional lines can also be included.

FIG. 1 further illustrates an analog interface according to one embodiment of the present invention. In the illustrated embodiment, this analog interface comprises an analog signal multiplexing interface 100 interposed between and interconnecting the PA/LD 20 and the controller 18. As discussed, the analog signal multiplexing interface 100 enables digital control of transceiver operations by the controller 18 via multiplexed analog control signals. Further details concerning the analog signal multiplexing interface 100 will be given hereafter.

Reference is now made to FIG. 2, which depicts various aspects of the controller 18. In one embodiment, the controller 18 comprises an integrated circuit on the PCB 12 and having various sub-components, some of which are explained here. The controller 18 includes a glue logic device 34 responsible for managing and distributing controller data and digital control signals relating to the operation of transceiver components, such as the integrated PA/LD 20. A memory component 35 comprising memory arrays, registers, or a combination of both, is located in the controller 18 to enable information relating to the operation of the transceiver 10 to be stored. The information stored in the memory component 35 can be gathered from the TOSA 14, ROSA 16, the PA/LD 20, or from various other transceiver components. In one embodiment, the information stored by the memory component 35 can be forwarded to the host device via the communication lines 32D.

The controller 18 further includes various interfacing components to enable the controller to communicate with various devices. For example, digital input/output nodes 33A are associated with the controller to facilitate communication between the memory component 35 and host device (not shown) via communication lines 32D. Data signals sent from the TOSA 14, the ROSA 16, and the PA/LD 20 via communication/control lines 25, 29, and 32A, respectively, are received by the controller 18 via an interface 33B. In a similar manner, signals carried on lines 32B and 32C relating to the receiver loss of signal and transmitter disabling can be received and dispensed by the controller 18 via a digital input/output interface 33C. Finally, a first node 102 of the analog signal multiplexing interface 100 is associated with the controller 18 to interface with a corresponding node on the PA/LD 20 via the interface signal lines 110 in accordance with one embodiment of the present invention and as described in further detail below.

It should be remembered that the above interfacing configuration as shown in FIG. 2 is but one possible configuration for the various inputs and outputs associated with the ioperation of the controller 18. Accordingly, the above description should not be construed to limit the present invention in any way. Furthermore, several of the input and output signals discussed above are either digital or analog; however, the digital or analog nature of any specific signal can be modified from what is illustrated or described herein so as to suit a particular application.

As already mentioned, one of the primary responsibilities of the controller 18 is to govern the operation of the TOSA 14 and ROSA 16 such that the electric and optical data signals associated therewith are properly converted, transmitted, and received in relation to the communications network and connected devices. The controller 18 governs the TOSA 14 and ROSA 16 via control components included in the PA/LD 20 as detailed below. The PA/LD control components are governed by the controller 18 via control signals that are transmitted from the controller to the components. In accordance with one embodiment of the present invention, transmission of these control signals from the controller 18 to the PA/LD 20 is performed in an analog manner via the analog signal multiplexing interface 100. The transmission of control signals as multiplexed analog signals enables enhanced control of transceiver operations while minimizing the amount of signal lines, pins, and connections needed for such control. The glue logic device 34 is a component of the controller 18 that organizes and arranges these control signals produced by the controller 18 before analog transmission to the PA/LD 20. Further details concerning the multiplexed analog transmission of the control signals via the analog interface 100 are given below.

Reference is now made to FIG. 3, which depicts various aspects of the PA/LD 20. As already mentioned, the PA/LD 20 is an integrated circuit located on the PCB 12 and conditions data signals that are to be transmitted or that have been received by the optical transceiver 10. In presently preferred embodiments, the PA/LD 20 is an integrated device, in contrast to known optical transceivers that have a post-amplifier that is a separate component from the laser driver. Integration of the post-amplifier and the laser driver into a single integrated circuit on the PCB 12 simplifies transceiver design and minimizes pin connections therein. Further details regarding the integrated post-amplifier/laser driver are given in the U.S. patent application Ser. No. 10/282,669, filed Oct. 29, 2002, which is incorporated herein by reference. It is appreciated that, in other embodiments, the post-amplifier and the laser driver can be configured on the PCB 12 as discrete components.

As already mentioned, a plurality of control devices are included in the PA/LD 20 to control operational parameters of both the TOSA 14 and the ROSA 16. In particular, control amplifiers 36, 38, 40, and 46 are used to modify as needed the operational parameters of the optical transceiver 10. Particularly, the control amplifiers 36, 38, 40, and 46 are employed to modify operational parameters related to the TOSA 14, loss of signal circuitry, the ROSA 16, and the laser bias current, respectively. Various other circuitry and devices 47 are associated with the PA/LD 20 to assist with the operation of the PA/LD as described herein.

In greater detail, the control amplifier 36 modifies parameters associated with electrical data signals received from a host device connected to the optical transceiver. These electrical data signals represent information from the host device that is to be converted to an optical signal and transmitted via the optical communications network to a remote device. As seen in FIG. 3, the incoming electrical data signal from the host device enters the PA/LD 20 and the control amplifier 36 via two opposite-polarity data lines 26A. The control amplifier 36 conditions and amplifies the electrical data signal before it is forwarded to the TOSA 14 via two opposite-polarity data lines 26B for conversion into an optical signal and transmission to the optical communications network. In the present embodiment, the control amplifier 36 adjusts at least two parameters of the electrical data signal. Specifically, the control amplifier 36 adjusts the rise time and amplitude of the electric data signal received from the host device. As will be explained, the magnitude of adjustment of these parameters is controlled via control signals sent by the controller 18 to the control amplifier 36.

In contrast, the control amplifier 40 conditions and amplifies an electrical data signal received from the ROSA 16 via opposite-polarity data lines 31B. This electric data signal represents information intended for the host device that has been previously converted by the ROSA 16 from an optical signal received from the communications network. After conditioning and amplification, the electrical signal is sent via opposite-polarity data lines 31A to a host device that is external to the optical transceiver 10. In the present embodiment, the control amplifier 40 adjusts at least two parameters of the incoming electric data signal received from the ROSA 16. Specifically, the control amplifier 40 adjusts the rise time and amplitude of the electric data signal received from the ROSA 16. The magnitude of adjustment of these parameters is controlled via control signals sent by the controller 18 to the control amplifier 40, as detailed further below.

Similar in function to the control amplifiers 36 and 40, the control amplifier 38 conditions and amplifies a loss of signal alert signal sent from the PA/LD 20 via the control line 32B. As mentioned, this loss of signal alert is forwarded from the PA/LD 20 to the controller 18 when the strength of the optical signal being received from the optical network r by the ROSA 16 drops below a specified level. In connection with this responsibility, the control amplifier 38 can in one embodiment also include an additional amplifier 37. At least two parameters, the threshold level and hysteresis of the loss of signal alert signal, can be modified by the control amplifier 38 according to control signals sent from the controller 18, as will be explained further below.

Finally, the control amplifier 46 conditions the laser driver bias current that is supplied to the laser 22 via the current line 27. A reference voltage is supplied to the control amplifier 46 to enable current conditioning such that the laser 22 operates under ideal conditions.

In the present embodiment, each of the control amplifiers 36, 38, 40, and 46 receives analog control signals from the controller 18 via the analog signal multiplexing interface 100 and uses the control signals to adjust the operational parameters associated with the respective control amplifier. In other embodiments, the analog signal multiplexing interface 100 can also transmit feedback signals from the control amplifiers 36, 38, 40, and 46 to the controller 18.

It is appreciated that the number and particular configuration of the control amplifiers as described above can be varied without affecting the present invention. For instance, more or fewer control amplifiers can be utilized in the PA/LD, as well as control amplifiers that control operational parameters in addition to those discussed above. Further, control devices and other components that perform operations distinct from amplifying and conditioning transceiver signals can also be digitally controlled in accordance with the present invention. Thus, though the above discussion describes one embodiment where the present invention can be utilized, it should not be interpreted as being limiting of the invention in any way.

As seen in FIG. 2, the first node 102 of the analog signal multiplexing interface 100 is operably connected to the glue logic device 34 of the controller 18, as already discussed Similarly, as seen in FIG. 3, the second node 104 of the multiplexing interface 100 is operably connected to a glue logic device 44 of the PA/LD 20. The glue logic device 44 is responsible for directing control signals received from the controller 18 via the multiplexing interface 100 to the proper control amplifier 36, 38, 40, or 46. Alternatively, the glue logic device 34 and 44 can comprise micro-controllers, if desired.

Various control signal lines 108 interconnect the glue logic device 44 to the various control amplifiers 36, 38, 40, and 46. Each control signal line 108 is operable to transmit an analog control signal from the glue logic device 44 to the respective control amplifier, thereby enabling the amplifier to modify a specified operating parameter of the transceiver 10. This process is described more fully below. In the illustrated embodiment of FIG. 3, seven operating parameters are controllable via the analog control signal lines 108: the reference voltage of the control amplifier 46 via analog control signal line 108A; the amplitude and risetime of the transmitter data signal (carried by the data lines 26A and 26B) via the analog control signal lines 108B and 108C, respectively; the LOS threshold and LOS hysteresis for the LOS signal (carried by the LOS signal line 42) via the analog control signal lines 108D and 108 E, respectively; and the amplitude and risetime of the receiver data signal (carried by the data lines 31A and 31B) via the analog control signal lines 108F and 108G, respectively. Again, in other embodiments, the analog control signal lines 108 or other lines can be employed to relay feedback signals from the respective amplifier to the glue logic device 44 for transmission to the controller 18 via the analog signal multiplexing interface 100.

As is seen by the above discussion, the controller 18 is operably connected to the control amplifiers 36, 38, 40, and amplifier 46 via the glue logic device 34, the analog signal multiplexing 100 interface 100, the glue logic 44, and the analog control signal lines 108. This configuration is presented as one embodiment of the present invention; other configurations that vary from that illustrated, such as the inclusion of components in addition to those described here, are also contemplated. Further, the glue logic device 44 as described herein is but one means for distributing analog control signals from the second node of the analog signal multiplexing interface 100 to at least one of the analog control signal lines 108. Other devices with the same functionality can alternatively be used.

Collective reference is now made to FIGS. 1, 2, and 3 in describing further details regarding the analog signal multiplexing interface 100. As already stated, the multiplexing interface 100 comprises a first node 102 associated with the controller 18, and second node 104 associated with the PA/LD 20. The two nodes 102 and 104 are connected to one another via one or more interface lines 110. In the present embodiment, two interface lines 110A and 110B are employed to carry analog control signals and a clock signal, respectively. However, the number and purpose of the interface lines 110 can vary from the above description according to the particular application involved.

As best seen in FIG. 2, the first node 102 of the multiplexing interface 100 generally comprises several components including a memory register 112, a multiplexor 114, a digital-to-analog signal converter ("DAC")116, a ring counter 118, and a clock 120. These components cooperate to provide a time division multiplexed analog control signal for transmission via the interface line 110A to the PA/LD 20 for control of specified operating parameters. The memory register 112 includes a plurality of storage locations configured to temporarily store digital control signals. The digital control signals are produced by the controller 18 and forwarded to the register 112 via the glue logic device 34. The storage locations in the memory register 112 can be equal in size, or can vary relative to one another.

The multiplexor 114 receives the digital control signals that are stored in the memory register 112 and combines them into a single, multiplexed digital signal. In presently preferred embodiments, the multiplexor 114 combines the multiplexed digital control signals using time division multiplexing techniques. Using these techniques, the multiplexor 114 is able to form a stream of digital control signals in a time-ordered, sequential basis. Thus, each discrete, digital control signal previously stored in the memory registered 112 occupies a specified temporal space in the multiplexed control signal. This multiplexing technique enables multiple digital control signals produced by the controller 18 to be combined into a unitary digital signal that can be converted and transmitted as an analog signal via a single interface line, as will be shown. It should be noted that other devices and techniques can also be used to organize the digital control signals such that they can be converted and transmitted as a unitary analog signal.

The DAC 116 receives the multiplexed digital control signal from the multiplexor 114 and convert it into an analog signal. The analog signal produced by operation of the DAC 116 retains its time division multiplexed character as created by the multiplexor 114. The DAC 116 is in operable communication with the interface line 110A to transmit the multiplexed analog control signal to the second node 104 of the analog signal multiplexing interface 100. More than one DAC can be included in the first node 102, if desired, in order to provide increased signal transmission rates, or enhanced system redundancy.

A selection device, such as the ring counter 118 is connected to the memory register 112 to enable the digital control signal content stored in the plurality of storage locations of the register to be sequentially accessed by the multiplexor 114. The ring counter 118 sequentially activates one storage location after another within the register 112, enabling the multiplexor 114 to access and read the digital control signal content stored therein. A clock signal provided by the clock 120 provides a time signal for the ring counter, which determines how long each storage location remains activated before activation is switched to the succeeding storage location. In other embodiments, logic devices other than a ring counter could alternatively be used to provide the same functionality as described herein.

As noted, the above-described components of the first node 102 of the analog signal multiplexing interface 100 are interconnected via the interface lines 110 to the second node 104. The second node 104 of the interface 100 generally includes a first buffer 122, an analog demultiplexor 124, a memory cell bank 126, a second buffer 128, and a ring counter 130. These components cooperate to receive the multiplexed analog control signal from the first node 102 and to divide it into its constituent discrete analog control signals. The first buffer 122 conditions the incoming multiplexed analog control signal in order to prevent problems related to signal reflection, signal loss, impedance mismatch, etc.

The analog demultiplexor 124 receives the multiplexed analog control signal from the first buffer 122 and divides it into its discrete analog control signals. Using time division demultiplexing techniques, the demultiplexor 124 is able to receive and separate each time-ordered analog control signal from the multiplexed signal.

The plurality of discrete analog control signals that are produced by the demutiplexor 124 can be temporarily stored in the analog memory cell bank 126. The memory cells comprising the bank 126 can comprise any acceptable type of memory storage component, and each cell is preferably used to store one analog control signal relating to a single operating parameter. The analog control signal content temporarily placed in each memory cell of the bank 126 is used to modify the operating parameters of the transceiver 10, as will be explained. Each memory cell can be equal in size, or can vary relative to one another. A second buffer 128 is connected to the memory cell bank 126 to condition outgoing analog control signals before being sent to the glue logic 44 via the glue logic input line 106.

The ring counter 130 is used with the memory cell bank 126 to enable the demultiplexor 124 to sequentially input the discrete analog control signals into successive cells within the bank. To do this, the ring counter 130 activates each cell in the bank 126 in order according to a clock signal received by the clock 120 included in the first node 102 via the clock signal line 10B. Thus, each cell in the bank 126 can be filled with a single analog control signal for later use. Thus, as described herein, the ring counter 118, the clock 120, and the ring counter 130 together comprise one means for temporally coordinating the transfer of analog signals between the controller and the PA/LD 20. Alternatively, other means could also be used.

Continuing reference to FIGS. 1, 2, and 3 is now made to describe the operation of the analog signal multiplexing interface 100 in providing control signals to the control devices of the transceiver 10, namely, the control amplifiers 36, 38, 40, and 46, according to presently preferred embodiments. The controller 18 first produces a plurality of digital control signals designed to modify various operating parameters of the transceiver via the control devices named above. Each digital control signal is input from the glue logic device 34 of the controller 18 to a specified storage location in the memory register 112. The particular storage location used to store a specified digital control signal is determined, at least in part, according to which storage location is activated by the ring counter 118. Once a specified digital control signal has been input into a particular storage location on the register 112, the ring counter 118 cycles activation to the succeeding storage location (according to a pre-defined time interval as determined by the clock 120), where the next digital control signal produced by the controller 18 is input. The glue logic device 33 or other device can assist in coordinating and arranging the various control signals for input into the register 112.

At some point after a plurality of digital control signals has been temporarily loaded into the memory register 112, the multiplexor 114 begins receiving successive digital control signals from the register and combining them into a single, multiplexed digital signal. This process can be continuous or intermittent, depending on the application. If desired, the various digital control signals can be combined by the glue logic device 33 to form a digital word. The digital word can then be multiplexed by the multiplexor 114. The multiplexed digital control signal is then forwarded to the DAC 116, where it is converted into a multiplexed analog control signal before being transmitted to the second node 104 via the interface signal line 110A.

The multiplexed analog control signal is first received by the first buffer 122 of the second node 104 via the interface signal line 110. After conditioning by the first buffer 122, the multiplexed analog control signal is received by the demultiplexor 124, where it is divided back into a plurality of discrete analog control signals. Each of these discrete analog control signals is fed into specified cells of the memory cell bank 126, the cell being chosen according to operation of the ring counter 130, as described above.

At a specified time after the loading of at least some of the discrete analog control signals into the memory cells, one or more of the discrete analog signals is forwarded through the second buffer 128 to the glue logic device 44 via the glue logic input line 106. The glue logic 44 sorts these analog control signals according to which operational parameter the signal is to modify, then redirects the signal to the appropriate control signal line 108. For example, one analog control signal received by the glue logic device 44 can comprise data intended to modify the amplitude of the transmitter data signal carried by the data lines 26A and 26B. Once received by the glue logic device 44, then, this amplitude-related control signal can be redirected by the glue logic to the control signal line 108B and be received by the control amplifier 36. The settings of the control amplifier 36 can then be modified by the amplitude-related control signal just received. This results in the modification of the amplitude of the transmitter data signal that passes through the control amplifier 36, thereby altering the desired operational parameter. This same process is followed to adjust control parameters associated with the other control amplifiers 38, 40, and 46, or other control devices not explicitly defined here. Further, simultaneous modification of more than one control device at one time is typical in presently preferred embodiments and is enabled through the present embodiment of the analog signal multiplexing interface 100.

It is appreciated that the analog signal multiplexing interface 100 can be varied from that illustrated in the appended drawings while still residing within the claims of the present invention. For instance, additional components can be added to either node of the interface in order to provide further conditioning or direction of the digital/analog control signals. Or, signals other than those described herein can be transmitted from the controller 18 to the PA/LD 20 in the same manner as described above. Thus, the above description is not meant to limit the present invention.

In another embodiment of the present invention, the present analog signal multiplexing interface 100 can be implemented as a bi-directional interface, thereby enabling each of the control devices to provide feedback and trim signals to the controller 18. In this case, the controller 18 can modify the control amplifiers as needed in response to the feedback data provided by the interface. A bi-directional interface would include a first node on the controller having both an analog-to-digital converter and a combined multiplexor/demultiplexor, and a second node on the PA/LD having bi-directional buffers as well as a combined multiplexor/demultiplexor. Other components, such as an additional feedback signal interface line between the two interface nodes, could be added as needed to provide the desired functionality.

Advantages gained from the present invention include simpler IC design featuring a reduced number of IC pins, fewer interconnects, and a reduction in external components. This in turn reduces design and fabrication costs. Less space is occupied by the present design, enabling more flexibility in the configuration of the transceiver.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

The invention claimed is:

1. A method of transmitting signals between first and second components in an optical transceiver, the method comprising the acts of:
   by the first component, producing a plurality of digital signals;
   converting the plurality of digital signals into a single analog multiplexed signal;
   sending the analog multiplexed signal from the first component to the second component via a first signal line;
   by the second component, converting the analog multiplexed signal into discrete analog signals; and
   forwarding each discrete analog signal to a respective control device of the second component, wherein each respective control device modifies an operating parameter of the optical transceiver.

2. A method of transmitting signals as defined in claim 1, further comprising the act of:
   temporarily loading the discrete analog signals into a memory location.

3. A method of transmitting signals as defined in claim 1, wherein the first component is a controller, and wherein the second component is selected from a group of components consisting of a post-amplifier and a laser driver.

4. A method of transmitting signals as defined in claim 1, wherein the first component is a controller, and wherein the second component is an integrated post-amplifier/laser driver.

5. method of transmitting signals as defined in claim 1, wherein the discrete analog signals comprise electrical signals.

6. A method of transmitting signals as defined in claim 1, further comprising the act of:
   by the second component, producing a plurality of analog feedback signals; and combining the plurality of analog feedback signals into an analog multiplexed feedback signal.

7. A method of transmitting signals as defined in claim 6, further comprising the act of:
   sending the analog multiplexed feedback signal from the second component to the first component via the first signal line.

8. In an optical transceiver, a method of transmitting control signals from a controller to a plurality of control devices, the method comprising the acts of:
   by the controller, producing a plurality of digital control signals;
   combining the plurality of digital control signals into a multiplexed digital control signal;
   converting the multiplexed digital control signal into a multiplexed analog control signal;
   dividing the multiplexed analog control signal into a plurality of analog control signals; and
   transmitting each analog control signal to one of the plurality of control devices in the optical transceiver.

9. A method of transmitting control signals as defined in claim 8, wherein each of the plurality of control devices is included in an integrated post-amplifier/laser driver.

10. A method of transmitting control signals as defined in claim 9, further comprising the act of:
    temporarily storing the plurality of digital control signals in a first memory component after the signals are produced by the controller.

11. A method of transmitting control signals as defined in claim 10, further comprising the act of:
    temporarily storing the plurality of analog control signals in a second memory component after the multiplexed analog control signal is divided.

12. A method of transmitting control signals as defined in claim 11, further comprising the act of:
    utilizing a clock signal in transmitting each analog control signal to a specified one of the plurality of control devices.

13. An optical transceiver, comprising:
a transmitter optical sub-assembly;
a receiver optical sub-assembly; and
a printed circuit board, comprising:
　a controller comprising an integrated circuit;
　a laser driver capable of conditioning a data signal to be transmitted by the transmitter optical sub-assembly;
　a post-amplifier capable of conditioning a data signal received by the receiver optical sub-assembly; and
　an analog interface configured to transmit a time division multiplexed analog control signal between the controller and at least one of the laser driver and the post-amplifier, the analog interface comprising:
　　a first node associated with the controller; and
　　a second node associated with at least one of the laser driver and post-amplifier.

14. An optical transceiver as defined in claim 13, wherein the laser driver and the post-amplifier are integrated as a single component.

15. An optical transceiver as defined in claim 13, wherein the first node further includes a multiplexer configured to combine digital control signals produced by the controller into a multiplexed digital control signal.

16. An optical transceiver as defined in claim 15, wherein the first node further includes a digital-to-analog converter configured to convert the multiplexed digital control signal into a multiplexed analog control signal.

17. An optical transceiver as defined in claim 16, wherein the second node includes a de-multiplexer configured to divide the multiplexed analog control signal received from the first node into discrete analog control signals.

18. An optical transceiver as defined in claim 13, further comprising a system clock having components that operate in relation to both the first and second nodes, the clock being configured to assist in the transfer of the multiplexed analog control signal from the controller to the integrated post-amplifier/laser driver.

19. An optical transceiver as defined in claim 13, wherein the discrete analog control signals are utilized by control devices included in at least one of the post-amplifier and the laser driver to modify at least one operating parameter of the optical transceiver.

20. An optical transceiver as defined in claim 19, wherein at least one of the control devices comprises an amplifier.

21. A signal interface for use in transmitting analog signals between first and second components positioned on a printed circuit board in an optical transceiver, the signal interface comprising:
　a first interface node included in the first component, the first interface node comprising:
　　a first storage component capable of temporarily storing digital signals produced by the first component;
　　a multiplexer capable of combining the digital signals into a digital time division multiplexed signal; and
　　a converter configured to convert the digital time division multiplexed signal to an analog time division multiplexed signal; and
　a second interface node included in the second component, the second interface node comprising:
　　a de-multiplexer capable of separating the analog time division multiplexed signal into discrete analog signals; and
　　a second storage component capable of temporarily storing the discrete analog signals for use by the second component.

22. A signal interface as defined in claim 21, wherein analog signals can be transmitted in either direction between the first component and the second component.

23. A signal interface as defined in claim 21, further comprising means for temporally coordinating the transfer of analog time division multiplexed signals between the first and second components.

24. A signal interface as defined in claim 23, wherein said means for temporally coordinating assists in the temporary storage of the digital signals in the first storage component and in the temporary storage of the discrete analog signals in the second storage component.

25. A signal interface as defined in claim 23, wherein said means for temporally coordinating comprises a clock and a first ring counter that operates in relation to the first interface node.

26. A signal interface as defined in claim 25, wherein said means for temporally coordinating further comprises a second ring counter that operates in relation to the second interface node.

27. A signal interface as defined in claim 21, wherein the first component comprises a controller, and wherein the second component comprises at least one of a post-amplifier and a laser driver.

28. A signal interface as defined in claim 21, further comprising at least one signal buffer included in the second interface node.

29. A signal interface as defined in claim 21, wherein the discrete analog signals are used by control devices included in the second component to control at least one operating parameter of the optical transceiver.

30. A signal interface as defined in claim 29, wherein at least one of the control devices comprises an amplifier.

31. A control signal interface for use in transmitting analog control signals between a controller and an integrated post-amplifier/laser driver positioned on a printed circuit board in an optical transceiver, the signal interface comprising:
　a first interface node included in the controller, comprising:
　　a first storage component capable of temporarily storing digital control signals produced by the controller;
　　a multiplexer capable of combining the digital control signals into a digital time division multiplexed control signal; and
　　a converter configured to convert the digital time division multiplexed control signal to an analog time division multiplexed control signal;
　a second interface node included in the integrated post-amplifier/laser driver, comprising:
　　a de-multiplexer capable of separating the analog time division multiplexed control signal received from the first interface node into discrete analog control signals;
　　a second storage component capable of temporarily storing the discrete analog control signals for use by the integrated post-amplifier/laser driver; and
　　a first buffer configured to condition the analog time division multiplexed control signal received from the first interface node; and
　a coordination system capable of temporally organizing the transfer of analog control signals between the first and second interface nodes.

32. A control signal interface as defined in claim 31, further comprising a first signal line interconnecting the first and second interface nodes, the first signal line capable of transmitting the analog time division multiplexed optical control signal from the first interface node to the second interface node.

33. A control signal interface as defined in claim 32, wherein the coordination system comprises:
   a clock associated with the first interface node capable of producing a clock signal; and
   a ring counter system configured to enable digital control signals to be loaded into successive portions of the first storage component according to the clock signal, the ring counter system also configured to enable the discrete analog control signals to be loaded into successive portions of the second storage component according to the clock signal.

34. A control signal interface as defined in claim 33, wherein the ring counter system comprises a first ring counter associated with the first interface node and a second ring counter associated with the second interface node.

35. A control signal interface as defined in claim 34, wherein the clock, first ring counter, and second ring counter of the coordination system are at least partially interconnected by a second signal line.

36. A control signal interface as defined in claim 35, wherein the second interface node further comprises a second buffer configured to condition the discrete analog control signals that have been temporarily stored in the second storage component.

37. A control signal interface as defined in claim 36, wherein the discrete analog control signals comprise electrical signals.

38. A control signal interface as defined in claim 37, wherein the discrete analog control signals are used by control devices included in the integrated post-amplifier/laser driver to modify at least one operating parameter of the optical transceiver.

39. A method of transmitting signals between first and second components in an optical transceiver, the method comprising the acts of:
   by the first component, producing a plurality of digital signals;
   converting the plurality of digital signals into a single analog multiplexed signal;
   sending the analog multiplexed signal from the first component to the second component via a first signal line;
   by the second component:
      converting the analog multiplexed signal into discrete analog signals;
      producing a plurality of analog feedback signals; and
      combining the plurality of analog feedback signals into an analog multiplexed feedback signal.

* * * * *

UNITED STATES PATENT AND TRADEMARK OFFICE
CERTIFICATE OF CORRECTION

PATENT NO. : 7,356,262 B2  Page 1 of 1
APPLICATION NO. : 10/703699
DATED : April 8, 2008
INVENTOR(S) : Giaretta et al.

It is certified that error appears in the above-identified patent and that said Letters Patent is hereby corrected as shown below:

Col. 4
Line 64 change "32D extending" to --32D (see Fig. 2) extending--

Col. 5
Line 55 change "ioperation" to --operation--

Col. 8
Line 25 change "100 interface 100" to --interface 100--

Col. 10
Line 9 change "by" to --from--
Line 10 change "10B" to --110B--
Line 36 change "33" to --34--
Line 46 change "33" to --34--

Signed and Sealed this

Sixteenth Day of February, 2010

David J. Kappos
*Director of the United States Patent and Trademark Office*